(12) United States Patent
Vivekanandan et al.

(10) Patent No.: US 6,536,948 B1
(45) Date of Patent: Mar. 25, 2003

(54) DETERMINING TEMPERATURE OF A PHYSICAL MEDIUM USING REMOTE MEASUREMENT

(75) Inventors: Jothiram Vivekanandan, Boulder, CO (US); Guifu Zhang, Erie, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 0 days.

(21) Appl. No.: 09/645,664

(22) Filed: Aug. 24, 2000

(51) Int. Cl.$^7$ .............................................. G01K 11/00
(52) U.S. Cl. ........................ 374/161; 374/120; 374/45; 324/643
(58) Field of Search ................................ 374/161, 120, 374/45, 142; 324/643, 640

(56) References Cited

U.S. PATENT DOCUMENTS

| | | | | |
|---|---|---|---|---|
| 4,481,517 A | * | 11/1984 | Brown | 73/170.16 |
| 4,703,175 A | * | 10/1987 | Salour et al. | 374/161 |
| 5,028,929 A | | 7/1991 | Sand et al. | |
| 5,410,314 A | * | 4/1995 | Frush et al. | 342/26 |
| 5,667,304 A | * | 9/1997 | Gelbwachs | 374/161 |
| 5,777,481 A | * | 7/1998 | Vivekanandan | 324/640 |

FOREIGN PATENT DOCUMENTS

| | | | | |
|---|---|---|---|---|
| EP | 466679 A | * | 1/1992 | |
| SU | 911232 B | * | 3/1982 | |

OTHER PUBLICATIONS

J. Vivekanandan, et al., Ice Water Path Estimation and Characterization Using Passive Microwave Radiometry, Journal of Applied Meterology, vol. 30, Oct. 1991, No. 10, pp. 1407–1421.*

Pitcher et al., English Language Abstract of EP 0466679 A, Derwent Acc. No. 1992–018263, Derwent Information Ltd.*

Wigley and Pitcher, English Language Translation of EP 0466679 A, PTO–2002–3582 (STIC Translations Branch, Translated by FLS, Inc., Jul. 2002), 22 pages.*

Lewis, William, "Meterological Aspects of Aircraft Icing," U. S. Weather Bureau, Washington, D. C., pp. 1197–1203, (No date).

Politovich, Marcia K., "Response of a Research Aircraft to Icing and Evaluation of Severity Indices," Journal of Aircraft, vol. 33, No. 2, Mar.–Apr. 1996, pp. 291–297.

Politovich, Marcia K., "Aircraft Icing Caused by Large Supercooled Droplets," Journal of Applied Meterology, vol. 28 (Manuscript recieved Jun. 4, 1988, in final form Jan. 17, 1989) pp. 856–868, (No date).

Vivekanandan, Li Li; Chan, C. H., and Tsang, Leung, "Microwave Radiometric Technique to Retrieve Vapor, Liquid and Ice, Part I—Development of a Neural Network—Based Inversion Method," IEEE Transactions on Geoscience and Remote Sensing, vol. 35, No. 2, pp. 224–236, (Mar. 1997).

(List continued on next page.)

Primary Examiner—Diego Gutierrez
Assistant Examiner—Stanley J. Pruchnic, Jr.

(57) ABSTRACT

A method, software, and system determines temperature of a physical medium using remote measurements. One example of a physical medium is a cloud. A receiver receives at least one first received signal from an interaction of at least one first transmitted electromagnetic signal with the physical medium. A processing system then determines the at least one first received signal information based on the at least one first received signal. The processing system then determines the temperature of the physical medium based on the at least one first received signal information.

48 Claims, 11 Drawing Sheets

OTHER PUBLICATIONS

Vivekanandan, J., Tsang, Leung, Chan, Chi, "Microwave Radiometric Technique to Retrieve Vapor, Liquid and Ice: Part II—Joint Studies of Radiometer and Radar in Winter Clouds," IEEE Transactions on Geoscience and Remote Sensing, vol. 35, No. 2 Mar. 1997, pp. 237–247.

Eccles, Peter J., "X–Band Attenuation and Liquid Water Content Estimation by a Dual–Wavelength Radar," Journal of Applied Meteorology, vol. 10, pp. 1252–1259, (Dec. 1971).

Eccles, P.J., and Atlas, D., "A Dual–Wavelength Radar Hail Detector," Aug. 1973, Department of the Geophysical Sciences, The University of Chicago, pp. 847–854.

Gosset, Marielle and Sauvageot, Henri, "A Dual–Wavelength Radar Method for Ice–Water Characterization in Mixed–Phase Clouds," Journal of Atmospheric and Oceanic Technology, vol. 9, American Meteorological Society, pp. 538–547, (Oct. 1992).

Vivekanandan, J., Martner, Brooks, and Politovich, Marcia, "Aircraft Icing Detection Using Dual–wavelength and Polarization Radar Observations," IEEE, 1998 pp. 432–436, (No month).

Sekelsky, Stephen M., Ecklund, Warner L., Frida, John, Gage, Kenneth, McIntosh, Robert E., "Particle Size Estimation in Ice–Phase clouds Using Multifrequency Radar Reflectivity Measurements at 95, 33, and 2.8 GHz," American Meterological Society, Jan. 1999, pp. 5–28.

Lawson, R. Paul, SPEC Incorporated, Boulder, Colorado, Politovich, Marcia K., National Center for Atmospheric Research, "Freezing Drizzle Encountered by a Research Aircraft Over the Park Range in Colorado," pp. 13–22, (No date).

Hansen, James E. and Travis, Larry D., "Light Scattering in Planetary Atmospheres," recieved May 15, 1974, Space Science Reviews 16 (1974) 527–610, (No month).

Ashenden, Russell and Marwitz, John D., "Turboprop Aircraft performance Response to Various Environmental Conditions," Journal of Aircraft, vol. 34, No. 3, May–Jun. 1997.

Vivekanandan, J. Zhang G., and Politovich, M. K., "Estimation of Cloud Droplet Size and Liquid Water Content Using Dual–Wavelength Radar Measurements," National Center for Atmospheric Research, Research Applications Program, (No date).

Zhang, Guifu, Vivekanandan, J., "Microwave Radar Technique for Retrieving Temperature," National Center for Atmospheric Research, Research Application Program, (No date).

Bernstein, Ben C., Ratvasky, Thomas P., Miller, Dean R., McDonough, Frank, "Freezing Rain As An In–Flight Icing Hazard," 8th Conference on Aviation, Range and Aerospace Meteorology, Dallas, Texas, Jan. 10–15, 1999, pp. 38–42.

Doviak, Richard J., Zrnic, Dusan S., "Doppler Radar and Weather Observations," Academic Press, 1993 (pps. 440–443) (No month).

Abel, P. G.; Houghton, J. T; J.B. Matley; Williamson, E. J., "Remote Sounding of Atmospheric Temperature From Satellites III. Measurements up to 35 KM Altitude with a Balloon–Borne Selective Chopper Radiometer"(Proc. Roy. Soc. Lond A. 320) Clarendon Laboratory, University of Oxford, Great Britian, Apr. 1970, pp. 57–69.

McMillian, R. W.; Bohlander, R. A.; and Baldygo, W. J., Jr., "Millimeter–Wave Atmospheric Turbulence Measurements: Instrumentation, Selected Results, and System Effects," International Journal of Infrared and Millimeter Waves, vol. 18, No. 1, 1997, pp. 233–258.

* cited by examiner

DETERMINING TEMPERATURE OF A PHYSICAL MEDIUM USING REMOTE MEASUREMENT

FIELD OF INVENTION

This invention relates to a method, software, and system for determining temperature of a physical medium. More particularly, the method, software, and system determine the temperature based on received signal information from a received signal.

Problem

Temperature in a physical medium such as a cloud is a factor in many weather related and also non-weather related applications. One weather-related application is a detection of supercooled liquid water in a cloud region for aircraft safety. Due to icing conditions of the supercooled liquid water, the cloud with supercooled liquid water can be hazardous for aircraft flying through the cloud. Supercooled liquid water clouds with large droplets (30–400 $\mu$m) can cause substantial loss of climb capability. Thus, detection of supercooled liquid water in clouds is critical so aircraft can avoid hazardous clouds.

Previous research has been performed for characterizing icing conditions such as the presence of supercooled liquid water. The research suggests that median volume diameter (MVD), liquid water content (LWC), and temperature are three important parameters that characterize the icing condition for supercooled liquid water.

Prior systems use radiometer and dual-frequency radar for detecting icing conditions. One prior system includes microwave radiometers that are ground or aircraft based to detect liquid water path. Unfortunately, one disadvantage of the microwave radiometer is that no range resolution is provided. Radiometers are also used to measure temperature, but the results are not proven for cloudy conditions. One prior system uses Lidars to measure drop size distribution. This Lidar is susceptible to large attenuation and hence their range is limited. Systems that use single frequency radar measure reflectivity with fine resolution but do not provide drop size and LWC.

The size of cloud droplets can range from a few micrometers to an order of a millimeter. The characteristic size such as MVD is used to define icing condition. However, size cannot be obtained from dual-frequency radar measurements unless assumptions for temperature and drop size distribution with only two measurements are made. One publication defines radar estimated size (RES) and shows that RES is more sensitive to icing condition than MVD. The publication also illustrates a method of retrieving LWC and RES based on dual-frequency radar measurements with an assumption of the temperature.

Since liquid cloud droplets are usually small and spherical, the polarimetric measurement is less useful except for the cloud with ice or in the mixed phase. Another prior system uses a dual-frequency radar technique to determine LWC through differential attenuation. This system uses dual frequency radar beams onboard an aircraft to determine the presence, amount, and location of liquid water in a cloud. The system determines the presence of liquid water based on the difference the liquid water attenuates the two radar signals with two different attenuation characteristics. This system is also used for detecting hail and delineating regions of liquid and ice. The system additionally uses a temperature sensor to provide ambient temperature information. One problem with this prior system is the temperature sensor only measures the temperature in the immediate vicinity of the aircraft and not in the cloud where the liquid water resides. Thus, the temperature sensor provides inaccurate temperature readings of the cloud.

Another prior system uses a satellite to measure temperature of a cloud based on natural emissions of the cloud. One deficiency of this system is the satellite only measures the temperature at the top of the cloud. Another prior system called Radio Acoustic Sounding System (RASS) transmits sound waves towards an object. The RASS then receives sound waves scattered or reflected off the object to determine temperature. One disadvantage of RASS is RASS only performs optimally in fair or clear weather conditions.

Another prior system collects radar measurement from 2.8 GHz (S band), 33.12 GHz ($K_a$ band) and 94.92 GHz (W band) frequencies from an ice-phase cloud. The system uses a neural network to estimate median particle size and peak number concentration in ice-phase clouds. One shortcoming of this prior system is the absence of temperature determination. Also, the system only applies to ice-phase cloud and not liquid clouds.

Unfortunately, all of these prior systems either assume temperature or calculate temperature imprecisely. There is a need to accurately determine temperature at any given point in a physical medium such as a cloud.

Solution

The invention solves the above problems by determining temperature of a physical medium using remote measurements. A remote measurement is a measurement where the receiver and the object to be measured are not in the same location. One example of a physical medium is a cloud. A receiver receives at least one first received signal from an interaction of at least one first transmitted electromagnetic signal with the physical medium. A processing system then determines the at least one first received signal information based on the at least one first received signal. The processing system then determines the temperature of the physical medium based on the at least one first received signal information.

In one embodiment of the invention, the receiver generates and transmits the at least one first transmitted electromagnetic signal into the physical medium. In another embodiment, the processing system determines a specific mass of the physical medium. In another embodiment, the processing system determines a characteristic size of the physical medium.

In another embodiment, the receiver receives a second received signal from the interaction of a second transmitted electromagnetic signal with the physical medium. The receiver also receives a third received signal from the interaction of a third transmitted electromagnetic signal with the physical medium. The processing system determines a second received signal information based on the second received signal. The processing system determines a third received signal information based on the third received signal. The processing system then determines a first attenuation difference based on the first received signal information and the second received signal information. The processing system determines a second attenuation difference based on the first received signal information and the third received signal information. The processing system then determines a ratio of the first attenuation difference and the second attenuation difference. The processing system finally determines the temperature of the physical medium based on the ratio.

The invention advantageously determines temperature accurately at any given point in a physical medium such as a cloud. In one embodiment, one advantage is the accuracy in temperature assists in detection of supercooled liquid water for aircraft safety because attenuation and scattering in clouds strongly depend on the temperature.

A particular reference number in one figure refers to the same element in all of the other figures.

DETAILED DESCRIPTION

Two Frequency Radar Retrieval—FIGS. 1–6

Radar reflectivity is proportional to microwave scattering from cloud particles. For small droplets in cloud (ka <<1, where ka is the size parameter), Rayleigh scattering approximation is valid. Rayleigh scattering approximation is valid for X-band, $K_a$-band with particle sizes up to 500 μm, and W-band with particle sizes up to 200 μm.

Radar reflectivity is related to the drop size distribution. The attenuation depends on frequency, liquid water content (LWC), and temperature. The relative dielectric constant of liquid water ($\epsilon_r$) is frequency and temperature dependent. In areas of Rayleigh scattering, reflectivity ($\eta_f$) is expressed as:

$$\eta_f(T) = \frac{\pi^5}{\lambda^4}|K_f(T)|^2 Z \quad mm^2 m^{-3} \quad (1)$$

where λ=wavelength;
$K_f(T)$=a dielectric factor, which is a dimensionless quantity and a function of dielectric constant as $(\epsilon_r-1)/(\epsilon_r+2)$; and
Z=radar reflectivity factor.

The radar reflectivity factor is expressed as:

$$Z=\int D^6 n(D)dD=<D^6> mm^6 m^{-3} \quad (2)$$

where D=particle diameter.

The attenuation coefficient of liquid cloud for Rayleigh scattering is expressed as:

$$A_f(T) = 4.343 \int k\varepsilon_r'' \left|\frac{3}{\varepsilon_r+2}\right|^2 \frac{\pi}{6} D^3 n(D) dD \quad (3)$$
$$= c_f(T) < D^3 > \geq C_f(T) LWC \text{ dB km}^{-1}$$

where LWC is the liquid water content;
k=2'/λ, which is the wave number; and
$C_f(T)=4.343k\epsilon_r''|3/(\epsilon_r+2)|^2$ is the attenuation constant, which is frequency and temperature dependent.

It is important to define a characteristic particle size that can be directly retrieved from radar measurements. Considering that the reflectivity factor is the sixth moment of particle diameter and the attenuation coefficient is proportional to the third moment, a radar estimated size (RES) is defined based on the sixth and third moment ratio, and can be calculated from Z-A ratio as:

$$RES = \left(\frac{\langle D^6 \rangle}{\langle D^3 \rangle}\right)^{1/3} = \left(c_f(T)\frac{Z}{A_f(T)}\right)^{1/3}. \quad (4)$$

Figure 1:
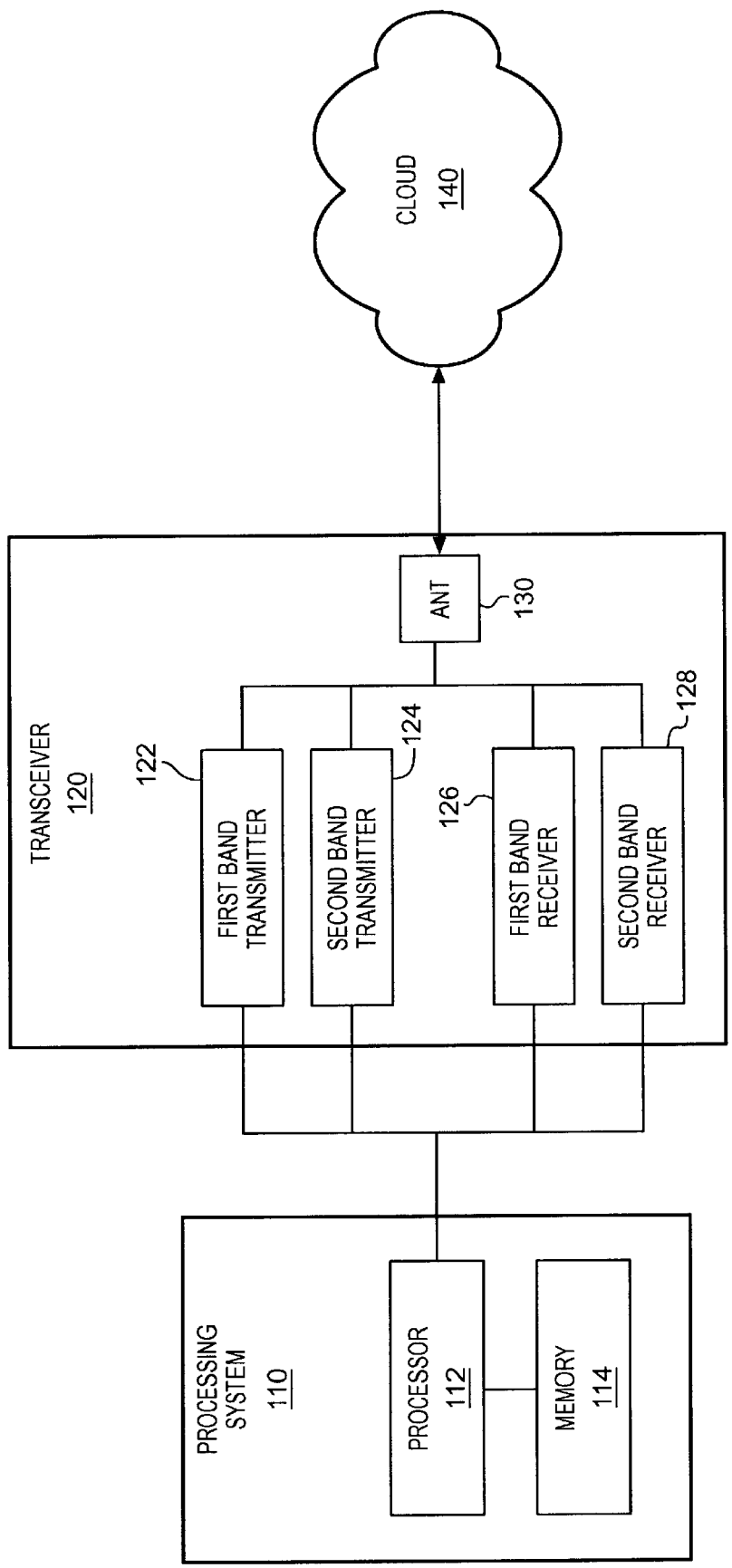
FIG. 1 is a block diagram for a system for two frequency radar retrieval in the prior art.

FIG. 1 depicts a block diagram for a system for two frequency radar retrieval in the prior art. FIG. 1 includes a processing system 110, a transceiver 120, and a cloud 140. The processing system 110 comprises a processor 112 and a memory 114. The transceiver 120 comprises a first band transmitter 122, a second band transmitter 124, a first band receiver 126, a second band receiver 128, and an antennae 130. The processor 112 is connected to the memory 114, the first band transmitter 122, the second band transmitter 124, the first band receiver 126, and the second band receiver 128. The antennae 130 is connected to the first band transmitter 122, the second band transmitter 124, the first band receiver 126, and the second band receiver 128.

Figure 2:
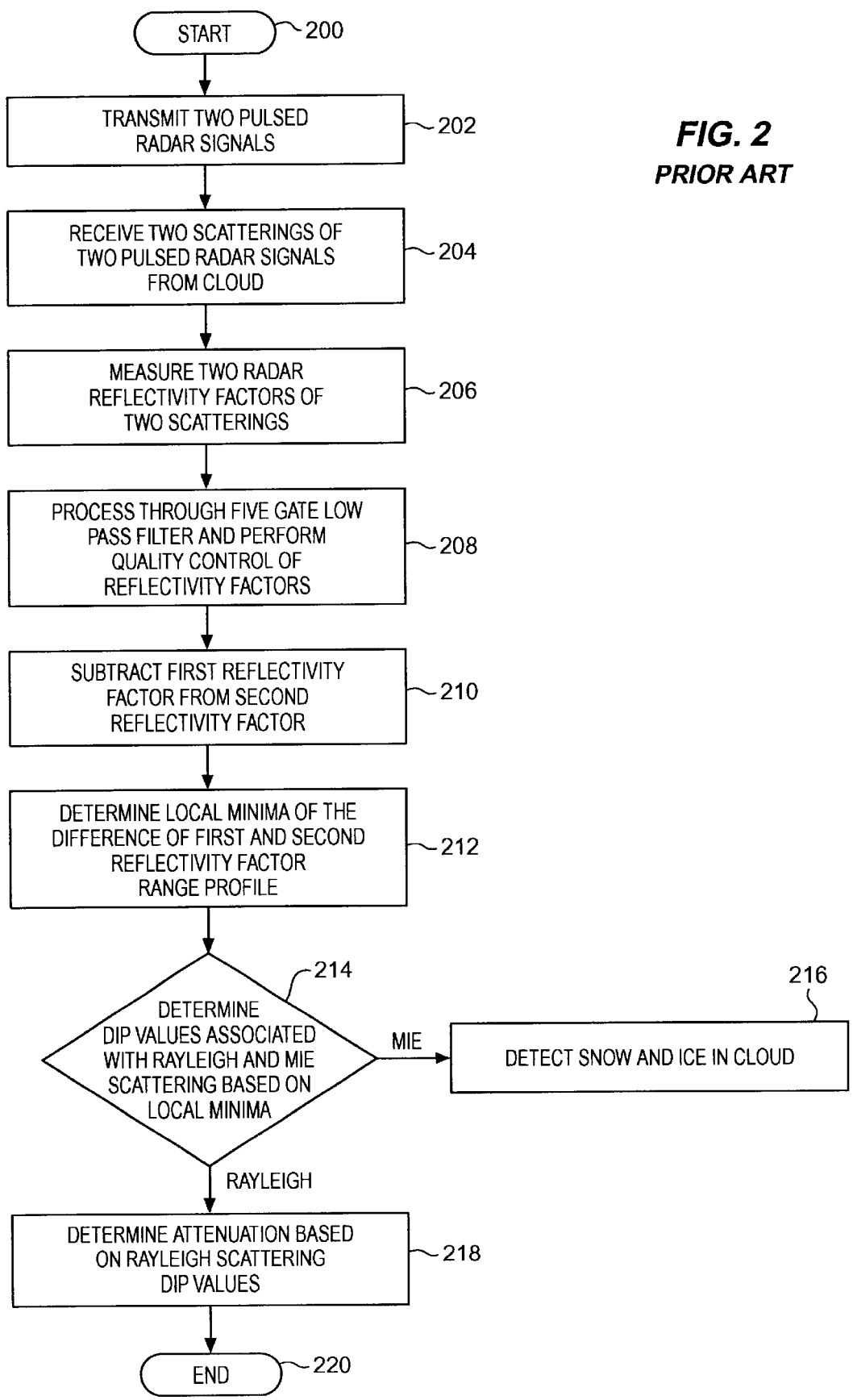
FIG. 2 is a flowchart for determining attenuation in the prior art.

FIG. 2 depicts a flowchart for determining attenuation in the prior art. FIG. 2 begins in step 200. In step 202, the first band transmitter 122 transmits a first pulsed radar signal towards the cloud 140 via the antennae 130. The second band transmitter 124 transmits a second pulsed radar signal towards the cloud 140 via the antennae 130. The first pulsed radar signal and the second pulsed radar signal interact with the cloud's 140 droplets. The interaction is based on the physics of wave scattering from small cloud droplets. In step 204, the first band receiver 126 then receives first scattering of the first pulsed radar signal from the cloud 140 via the antennae 130. The second band receiver 128 then receives second scattering of the second pulsed radar signal from the cloud 140 via the antennae 130.

In step 206, the processor 112 then measures a first reflectivity factor based on the first scattering. The processor 112 also measures a second reflectivity factor based on the second scattering. In actual radar measurements, the received reflectivity factor is comprised of attenuation due to absorption of cloud and gaseous particles and is normalized at a constant temperature. The measured radar reflectivity factor $Z^m_f$ is then expressed as:

$$Z^m_f = Z \frac{|K_f(T)|^2}{|K_f(T_0)|^2} 10^{-0.2\int_0^r A_f(T,r')dr'}. \tag{5}$$

where r=range to target from the radar transmitter.

In step 208, the processor 112 processes the first reflectivity factor and the second reflectivity factor through five gate low pass filters and performs quality control of reflectivity factors. In step 210, the processor 112 then subtracts the first reflectivity factor from the second reflectivity factor. In step 212, the processor 112 then determines the local minima of the difference in the first reflectivity factor and the second reflectivity factor range profile. In step 212, the processor 112 then determines dip values associated with the Rayleigh and Mie scattering based on the local minima. For Mie scattering, the processor 112 then detects snow and ice in the clouds in step 216.

For Rayleigh scattering, the processor 112 determines the specific attenuation based on the Rayleigh scattering dip values in step 218. A dual-frequency reflectivity ratio (DWR) is expressed as:

$$DWR_{1,2}(r) = 10 \log\left(\frac{Z^m_1(T)}{Z^m_2(T)}\right) \tag{6}$$

$$= 10 \log\left(\frac{|K_1(T)|^2 |K_2(T_0)|^2}{|K_2(T)|^2 |K_1(T_0)|^2}\right) +$$

$$2 \int_0^r [A_2(T,r') - A_1(T,r')]dr'.$$

In equation 6, the difference between two channel attenuation is related to the measured reflectivity ratio. This is obvious for the difference of the ratio over a range Δr.

$$\Delta DWR(r) = DWR(r + \Delta r) - DWR(r) = \tag{7}$$

$$10 \log\left(|(K_1(T(r+\Delta r))|^2 \frac{|K_2(T(r))|^2}{|K_2(T(r+\Delta r)|^2 |K_1(T(r))|^2}\right) +$$

$$2 \int_r^{r+\Delta r} [A_2(T,r') - A_1(T,r')]dr'$$

Since the radar range gate Δr is usually small compared with propagation distance, $|K_f(T(r+\Delta r))|^2$ and $|K_f(T(r))|^2$ are very close to each other. Therefore, the first term in equation 7 can be neglected. So we have the specific attenuation difference as:

$$\Delta A(T,r) \approx \Delta DWR/2/\Delta r. \tag{8}$$

After the processor 112 determines the specific attenuation difference is obtained, the cloud parameters such as liquid water content and radar estimated size can be retrieved. FIG. 2 ends in step 220.

Figure 3:
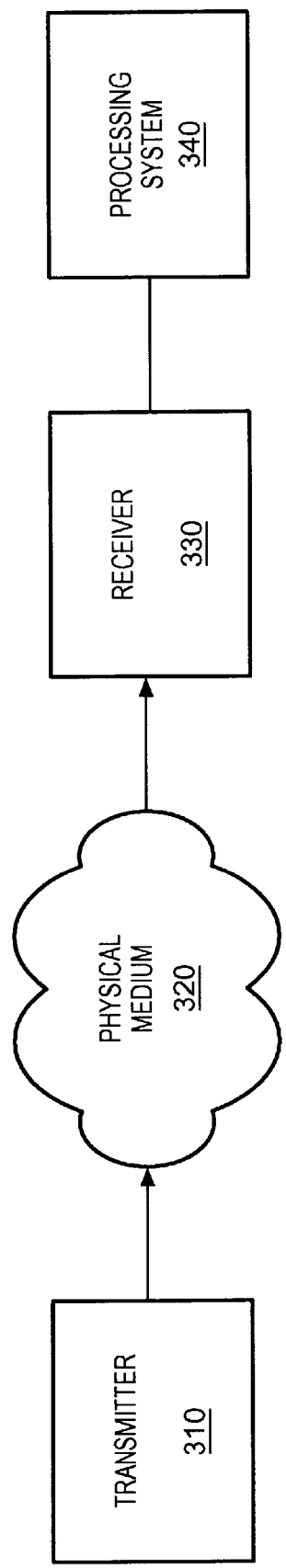
FIG. 3 is a block diagram of a system for temperature determination in an example of the invention.
Figure 4:
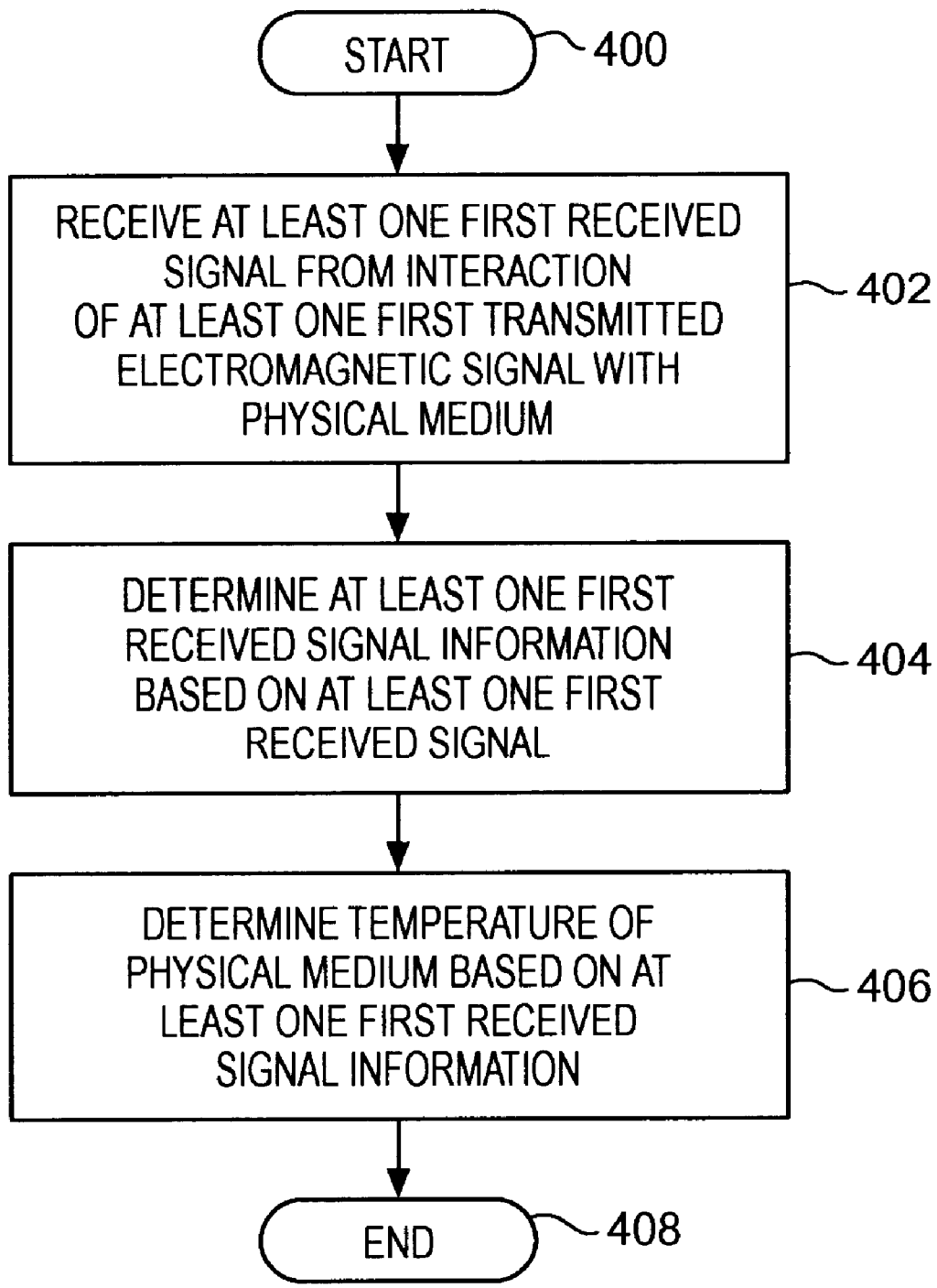
FIG. 4 is a flowchart for the system for temperature determination in an example of the invention.

Temperature Determination—FIGS. 3–4

FIG. 3 depicts a block diagram of a system for temperature determination in an example of the invention. FIG. 3 includes a transmitter 310, a physical medium 320, a receiver 330 and a processing system 340. The receiver 330 is connected to the processing system 340.

The transmitter 310 could be any device configured to transmit at least one first transmitted electromagnetic signal into the physical medium 320. The physical medium 320 is any gas, solid or liquid. One example of the physical medium 320 is a cloud. In one embodiment, the physical medium 320 includes particles or scatterers. The receiver 330 is any device configured to receive at least one first received signal from an interaction of at least one transmitted electromagnetic signal with the physical medium 320. A received signal is any resulting signal from an interaction of at least one transmitted electromagnetic signal with the physical medium 320. In one embodiment, the interaction is scattering such as Rayleigh scattering or Mie scattering. In another embodiment, the interaction is propagation through the physical medium 320. The transmitted electromagnetic signal is any signal in the electromagnetic spectrum that is transmitted towards the physical medium 320. In one embodiment, the transmitted electromagnetic signal is pulsed. In another embodiment, the transmitted electromagnetic signal is a continuous wave signal. In another embodiment, the transmitted electromagnetic signal is radar.

The processing system 340 is any system configured to determine at least one first received signal information based on the at least one first received signal and determine the temperature of the physical medium 320 based on the at least one first received signal information. Received signal information is any information related to the received signal. Some examples of received signal information are reflectivity ($\eta_f$) and radar reflectivity factor (Z). One example of the operation of the processing system 340 is discussed below in FIGS. 5–6.

FIG. 4 depicts a flowchart for the system for temperate determination in an example of the invention. FIG. 4 begins in step 400. In step 402, the receiver 330 receives at least one first received signal from an interaction of at least one first transmitted electromagnetic signal with the physical medium 320. In step 404, the processing system 340 determines at least one first received signal information based on the at least one first received signal. In step 406, the processing system 340 determines the temperature of the physical medium 320 based on the at least one first received signal information. FIG. 4 ends in step 408. In other embodiments, the processing system 340 determines a specific mass such as LWC of the physical medium 320. In other embodiments, the processing system 340 determines a characteristic size such as RES or MVD of the physical medium 320. The processing system 340 advantageously determines temperature accurately at any given point, in the physical medium 320 such as a cloud.

Temperature Determination with X-, $K_a$- and W- band Frequencies—FIGS. 5–13

FIGS. 5–13 disclose one embodiment of the invention, but the invention is not restricted to the configuration provided below. Those skilled in the art will appreciate numerous variations in a transceiver and processing system configuration and operation that are within the scope of the invention. Those skilled in the art will also appreciate how the principles illustrated in this example can be used in other examples of the invention.

Figure 5:
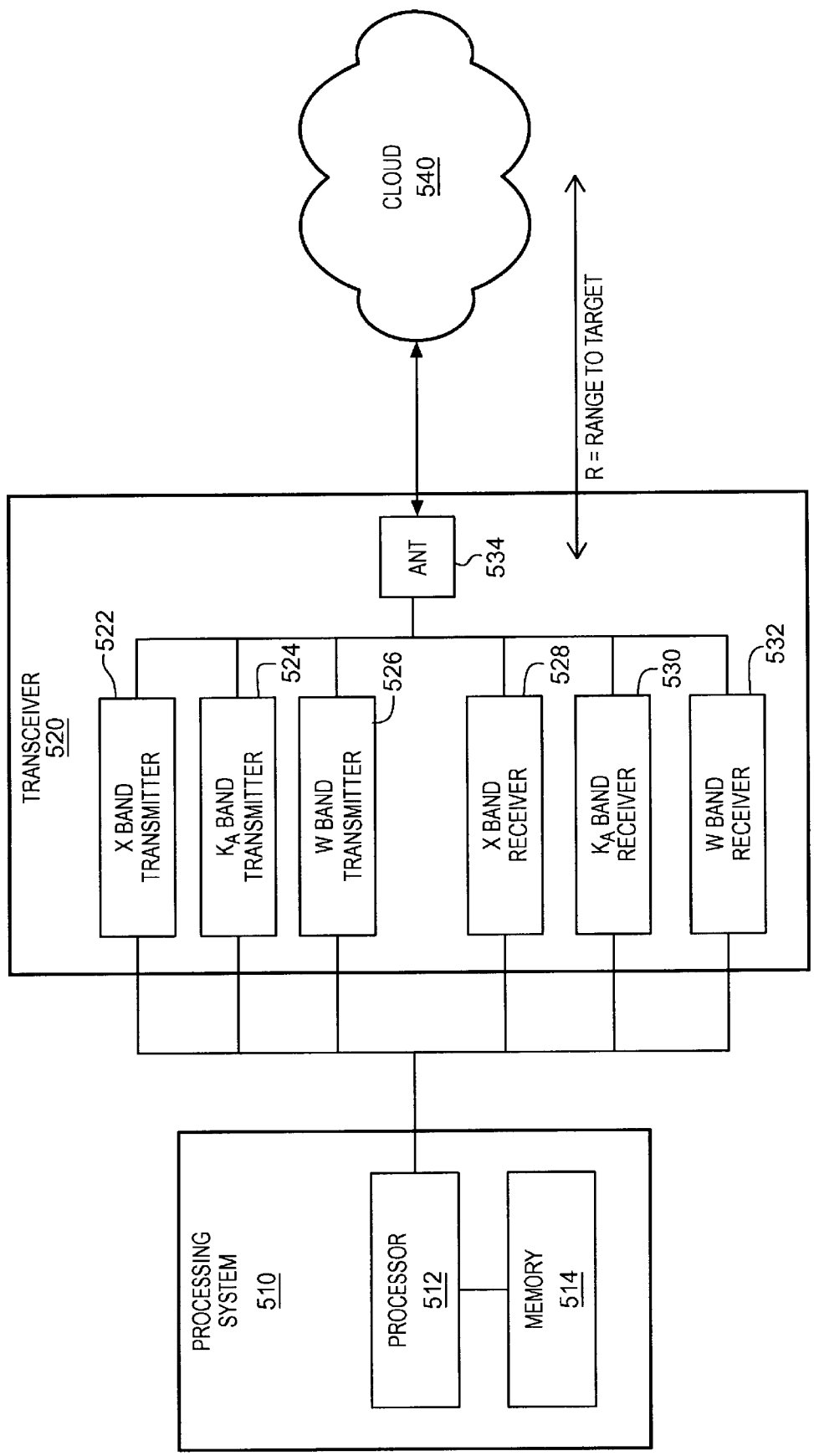
FIG. 5 is a block diagram of a system for temperature determination using X-, $K_a$- and W-band frequencies in an example of the invention.

FIG. 5 depicts a block diagram of a system for temperature determination using X-, $K_a$- and W-band frequencies in an example of the invention. FIG. 5 includes a processing system 510, a transceiver 520, and a cloud 540. The processing system 510 comprises a processor 512 and a memory 514. The transceiver 520 comprises an X-band transmitter 522, a $K_a$-band transmitter 524, a W-band transmitter 526, an X-band receiver 528, a $K_a$-band receiver 530, a W-band receiver 532, and an antennae 534. The processor 512 is connected to the memory 514, the X-band transmitter 522, the $K_a$-band transmitter 524, the W-band transmitter 526, the X-band receiver 528, the $K_a$-band receiver 530, and the W-band receiver 532. The antennae 534 is connected to X-band transmitter 522, the $K_a$-band transmitter 524, the W-band transmitter 526, the X-band receiver 528, the $K_a$-band receiver 530, and the W-band receiver 532. The processing system 510 is configured to control the operations of the transceiver 520.

Figure 6:
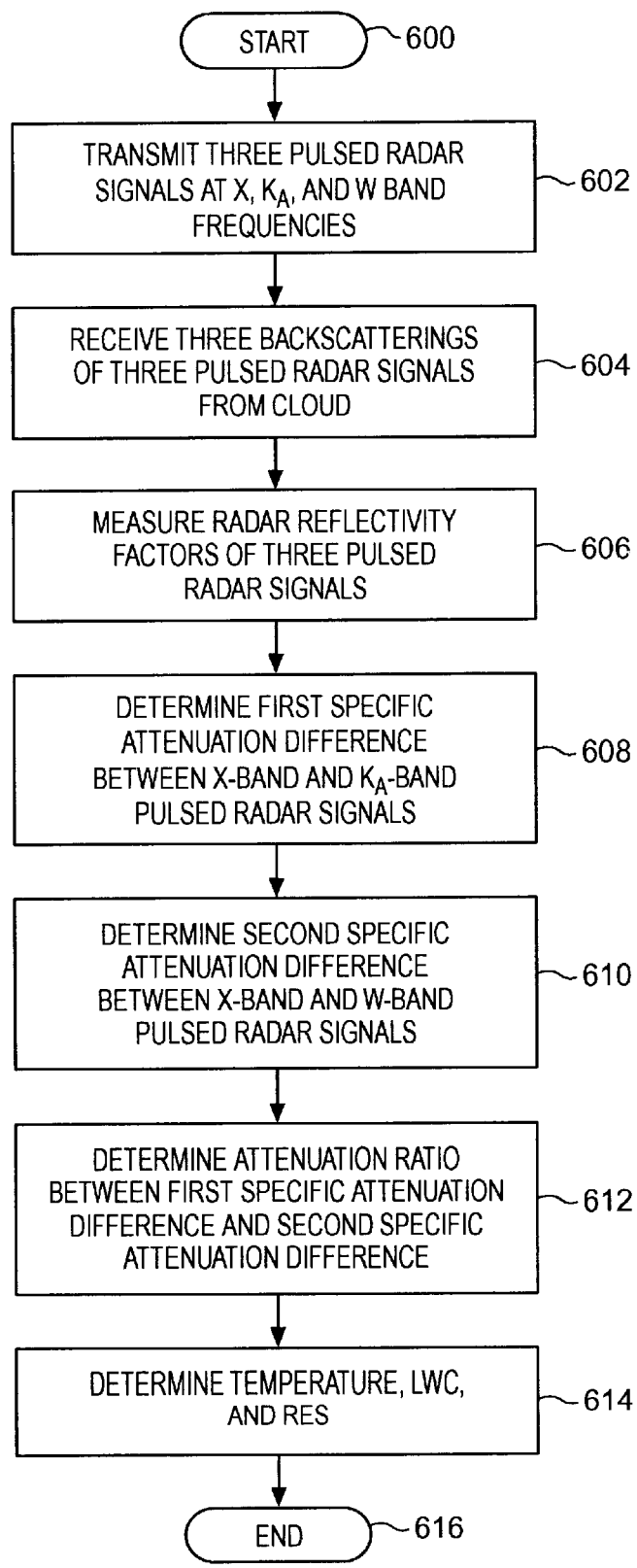
FIG. 6 is a flowchart for a system for temperature determination using X-, $K_a$- and W-band frequencies in an example of the invention.

FIG. 6 depicts a flowchart for a system for temperature determination using X-, $K_a$- and W-band frequencies in an example of the invention. The three channels at X-, $K_a$- and W-band frequencies are chosen such that the attenuation at one channel can be negligible; i.e., the reference channel (X-band) and the other two channels with attenuation of different temperature dependence. FIG. 6 begins in step 600. In step 602, the X-band transmitter 522 transmits an X-band pulsed radar signal with a frequency of 9.3 GHz towards the cloud 540 via the antennae 534. The $K_a$-band transmitter 524 transmits a $K_a$-band pulsed radar signal with a frequency of 35 GHz towards the cloud 540 via the antennae 534. The W-band transmitter 526 transmits a W-band pulsed radar signal with a frequency of 94 GHz towards the cloud 540 via the antennae 534. The X-band pulsed radar signal, the $K_a$-band pulsed radar signal, and the W-band pulsed radar signal interact with the cloud's 540 droplets.

In step 604, the X-band receiver 528 then receives X-band scattering of the X-band pulsed radar signal from the cloud 540 via the antennae 534. The $K_a$-band receiver 530 then receives $K_a$-band scattering of the $K_a$-band pulsed radar signal from the cloud 540 via the antennae 534. The W-band receiver 532 then receives W-band scattering of the W-band pulsed radar signal from the cloud 540 via the antennae 534. In step 606, the processor 512 measures a first reflectivity factor based on the X-band scattering. The processor 512 also measures a second reflectivity factor based on the $K_a$-band scattering. The processor 512 also measures a third reflectivity factor based on the W-band scattering.

In step 608, the processor 512 determines a first specific attenuation difference, $\Delta A_{21}(r)$, between the X-band pulsed radar signal and the $K_a$-band pulsed radar signal based on the first reflectivity factor and the second reflectivity factor. The determination of the specific attenuation difference based on reflectivity factors is discussed above in FIG. 2. In step 610, the processor 512 determines a second specific attenuation difference, $\Delta A_{31}(r)$, between the X-band pulsed radar signal and the W-band pulsed radar signal based on the first reflectivity factor and the third reflectivity factor.

Figure 7:
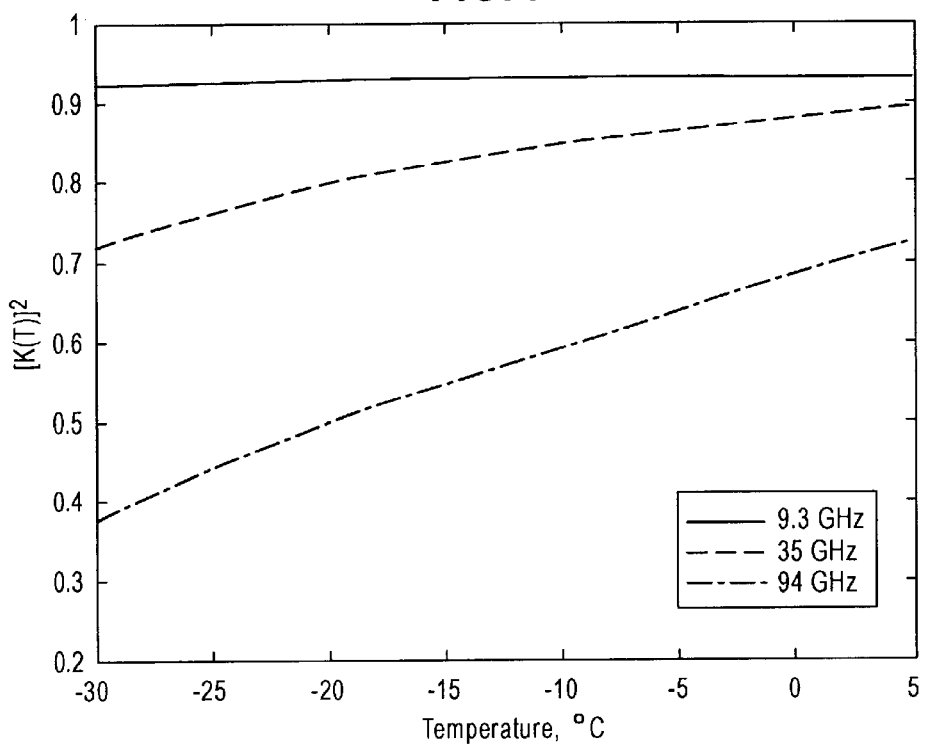
FIG. 7 is a graph for temperature vs. $K_f(T)$, a dielectric factor, in an example of the invention.

FIG. 7 depicts a graph for temperature vs. $K_f(T)$, a dielectric factor, in an example of the invention. FIG. 7 illustrates that $K_f(T)$ depends on both frequency and temperature. At 94 GHz, $|K_f(T)|^2$ changes from 0.45 to 0.75. In contrast, $|K_f(T)|^2$ is insensitive to temperature at 9.3 GHz. The radar reflectivity is usually normalized with $K_f(T_0)|^2$ at a specific temperature $T_0$. This causes a bias in the reflectivity factor by $|K_f(T)|^2/|K_f(T_0)|^2$ that can be as much as an 80% deviation from the actual value.

Figure 8:
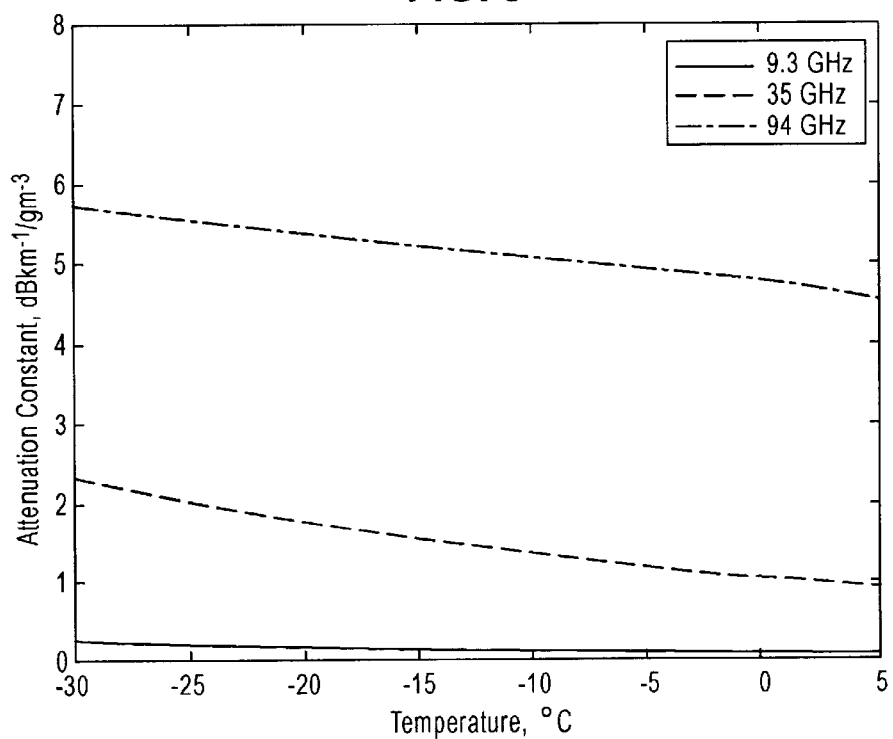
FIG. 8 is a graph for temperature vs. the attenuation constant in an example of the invention.

FIG. 8 depicts a graph for temperature vs. the attenuation constant in an example of the invention. FIG. 8 illustrates that the attenuation at higher frequencies is larger, and the slopes are also different for different frequencies. The higher the frequency, the larger the slope.

Figure 9:
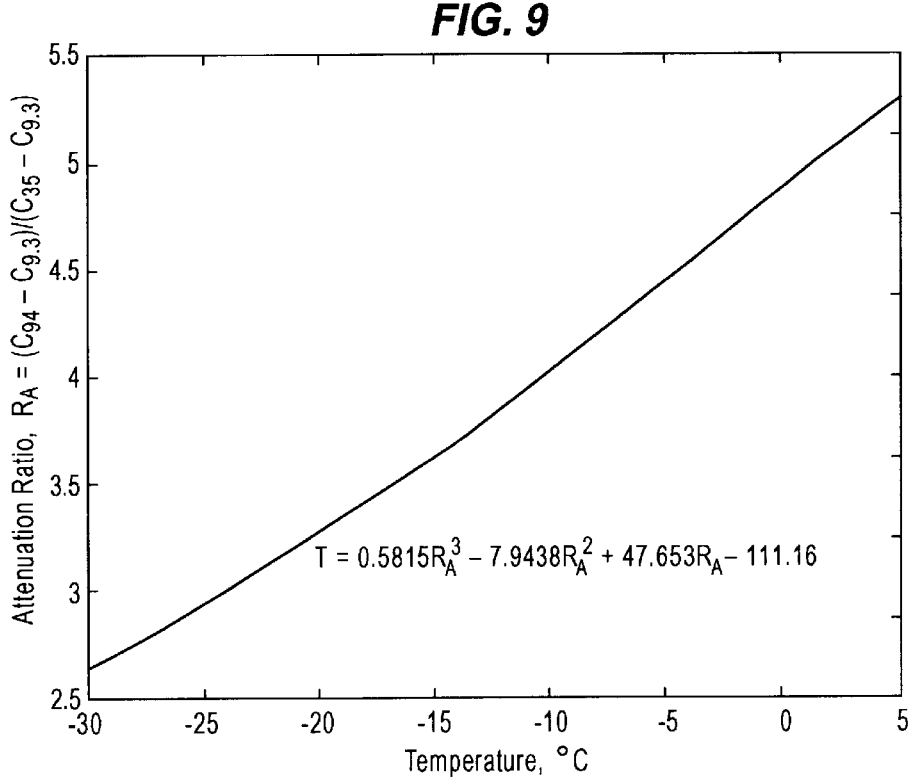
FIG. 9 is a graph of the temperature vs. the attenuation ratio between 35–9.3 GHz pair and 94–9.3 GHz pair in an example of the invention.

In step 612, the processor 512 then determines the attenuation ratio between the first specific attenuation difference and the second specific attenuation difference. FIG. 9 depicts a graph of the temperature vs. the attenuation ratio between 35–9.3 GHz pair and 94–9.3 GHz pair in an example of the invention. FIG. 9 shows that the attenuation ratio is a monotonous function of temperature changing from 2.5 at −30° C. to 5.0 at 5° C. This dependence of attenuation ratio on temperature is the basis for temperature retrieval. The ratio is expressed as follows:

$$R_A(r) = \frac{\Delta A_{31}(r)}{\Delta A_{21}(r)} = \frac{C_3(T) - C_1(T)}{C_2(T) - C_1(T)} \qquad (8)$$

In step 614, the processor 512 then determines the temperature of the cloud based on the ratio of specific attenuation differences. In one embodiment, the processor 512 uses the following polynomial curve fitting, which was obtained from a Rayleigh model calculation:

$$T = 0.5815 R_A^3 - 7.9438 R_A^2 + 47.653 R_A - 111.16 \qquad (9)$$

for three channels of 9.3, 35, and 94 GHz. The processor 512 also determines LWC at the temperature obtained above. The LWC is expressed as:

$$LWC(r) = \frac{\Delta A_{21}(r)}{C_2(T) - C_1(T)} = \frac{\Delta A_{31}(r)}{C_3(T) - C_1(T)}. \qquad (10)$$

The processor 512 also determines particle size (RES) with the following equation:

$$RES(r) = \left(\frac{6}{\pi \rho} \frac{Z_1}{LWC}\right)^{1/3} \qquad (11)$$

$$= \left((c_2(T) - c_1(T))\frac{Z_1}{\Delta A_{21}}\right)^{1/3} = \left((c_3(T) - c_1(T))\frac{Z_1}{\Delta A_{31}}\right)^{1/3}.$$

Figure 10:
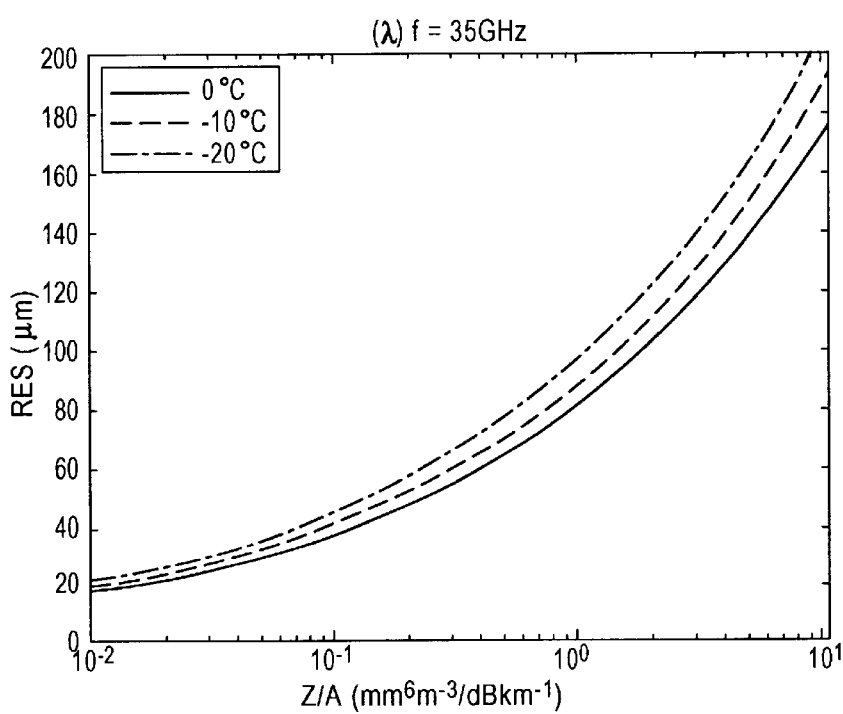
FIG. 10 is a graph of a ratio of radar reflectivity factor and attenuation vs. radar estimated size for 35 GHz in an example of the invention.
Figure 11:
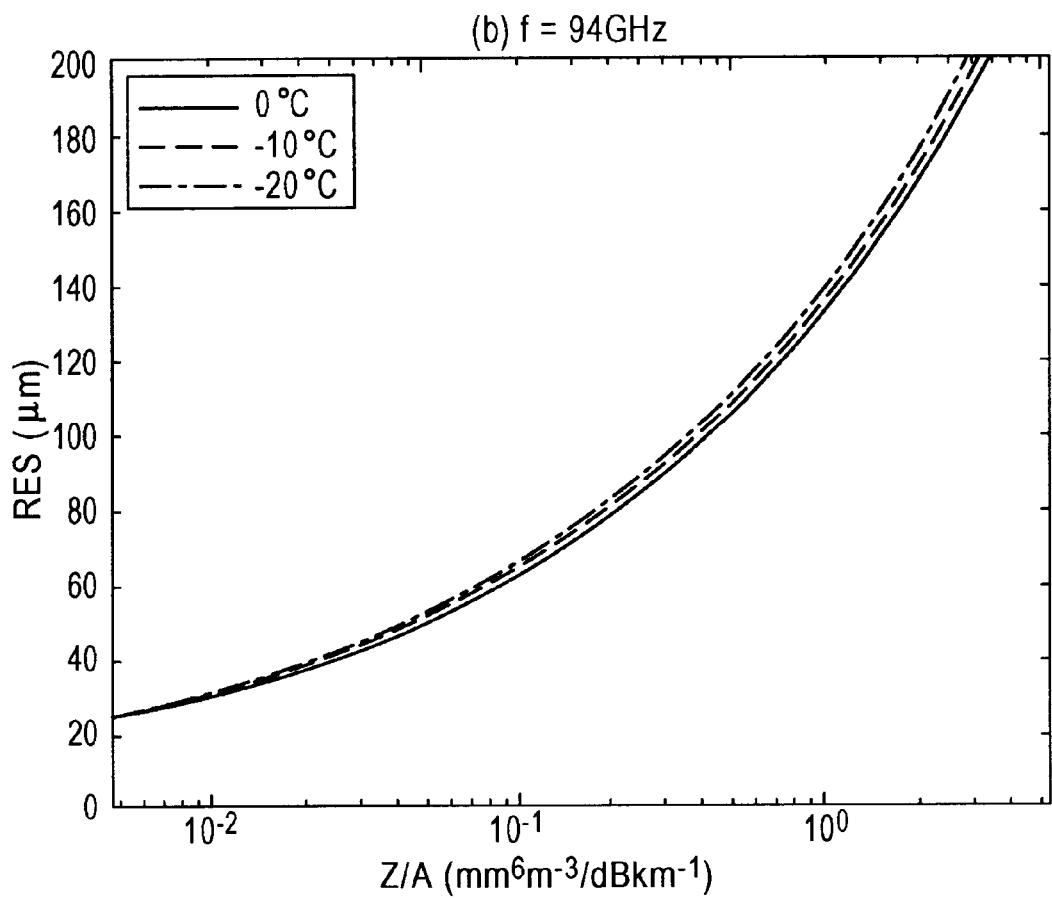
FIG. 11 is a graph of a ratio of radar reflectivity factor and attenuation vs. radar estimated size for 94 GHz in an example of the invention.

FIG. 10 depicts a graph of a ratio of radar reflectivity factor and attenuation vs. radar estimated size for 35 GHz in an example of the invention. FIG. 11 depicts a graph of a ratio of radar reflectivity factor and attenuation vs. radar estimated size for 94 GHz in an example of the invention. Both FIGS. 10 and 11 show that RES is a monotonous increase function of Z-A ratio at a specific temperature. The relation at 35 GHz has stronger temperature dependence than at 94 GHz. Therefore, the Z-A ratio at 94 GHz can be better for determining RES. Median Volume Diameter (MVD) cannot be retrieved directly from the Z-A ratio without assuming drop size distribution.

In one embodiment, the processor 512 determines the LWC and the RES based on either pair of X-band/ $K_a$-band or X-band/W-band pulsed radar signals. In one embodiment, once the temperature, LWC, and RES are determined, the processing system 510 can then detect supercooled liquid water in clouds. Thus, the processing system 510 can warn aircraft of hazardous clouds with supercooled liquid water.

Figure 12A:
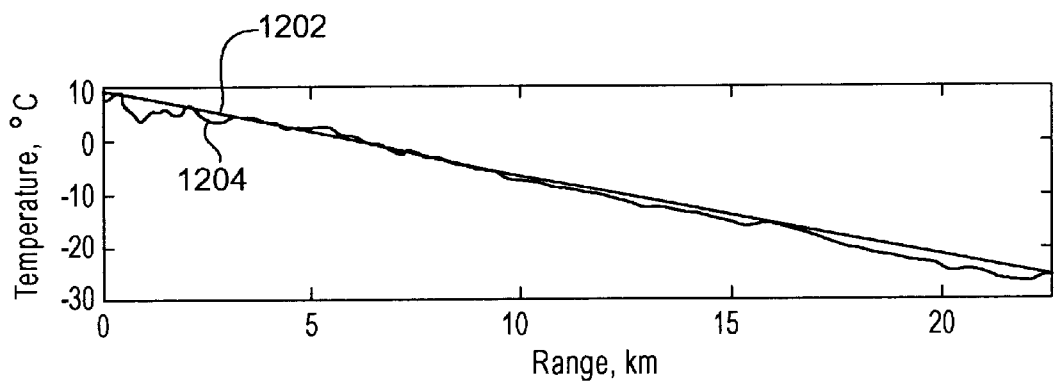
FIG. 12A is a graph of range vs. assumed and retrieved profiles of temperature in an example of the invention.
Figure 12B:
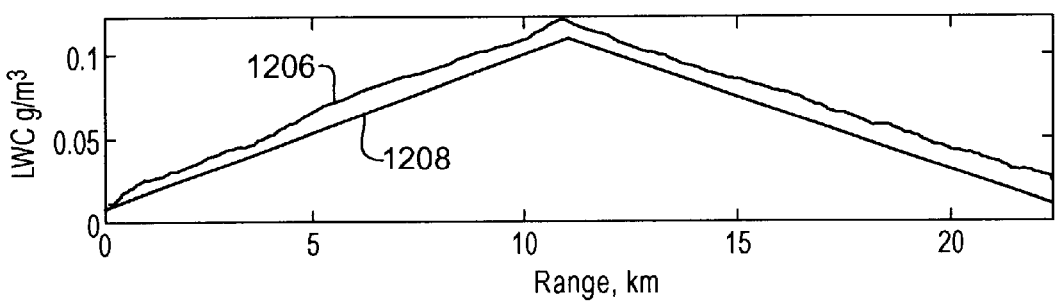
FIG. 12B is a graph of range vs. assumed and retrieved profiles of liquid water content in an example of the invention.
Figure 12C:
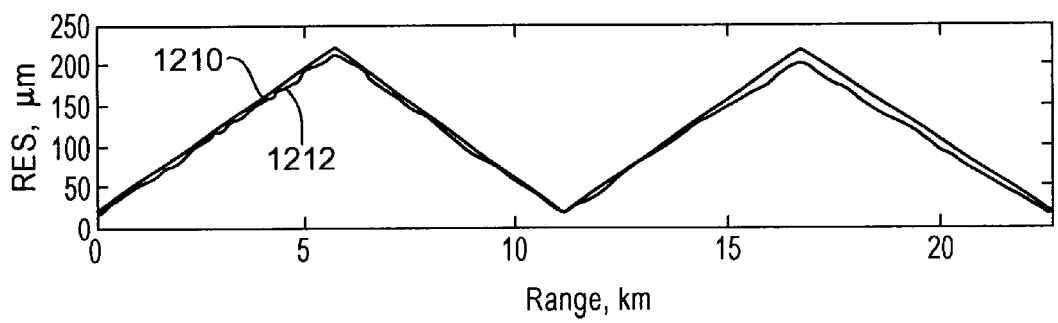
FIG. 12C is a graph of range vs. assumed and retrieved profiles of radar estimated size in an example of the invention.

FIGS. 12A–C and 13 show a numeric simulation of radar reflectivity for liquid cloud and retrieval of the corresponding cloud parameters from the simulated data. FIGS. 12A–C show the profiles of the temperature, LWC and RES in solid lines as a function of radar range. In FIGS. 12A–C, the solid lines 1202, 1208, and 1210 represent true values, while the dashed lines 1204, 1206, and 1212 represent retrieved results. FIG. 12A depicts a graph of range vs. temperature in an example of the invention. FIG. 12A shows the temperature profile which decreases as the range increases. The retrieved temperature agrees well with the real value, especially in the middle range. There are some fluctuations of retrieved temperature, but the main feature is captured. FIG. 12B depicts a graph of range vs. liquid water content in an example of the invention. FIG. 12B illustrates the distribution of LWC that is a triangle function of range. The retrieved LWC is in good agreement with the model profile. The difference might be due to the assumption of fixed temperature rather than the actual temperature profile. FIG. 12C depicts a graph of range vs. radar estimated size in an example of the invention. FIG. 12C shows the change of the characteristic size--RES of cloud droplets. The retrieved RES's from the two channels also agree well with the true value.

Figure 13:
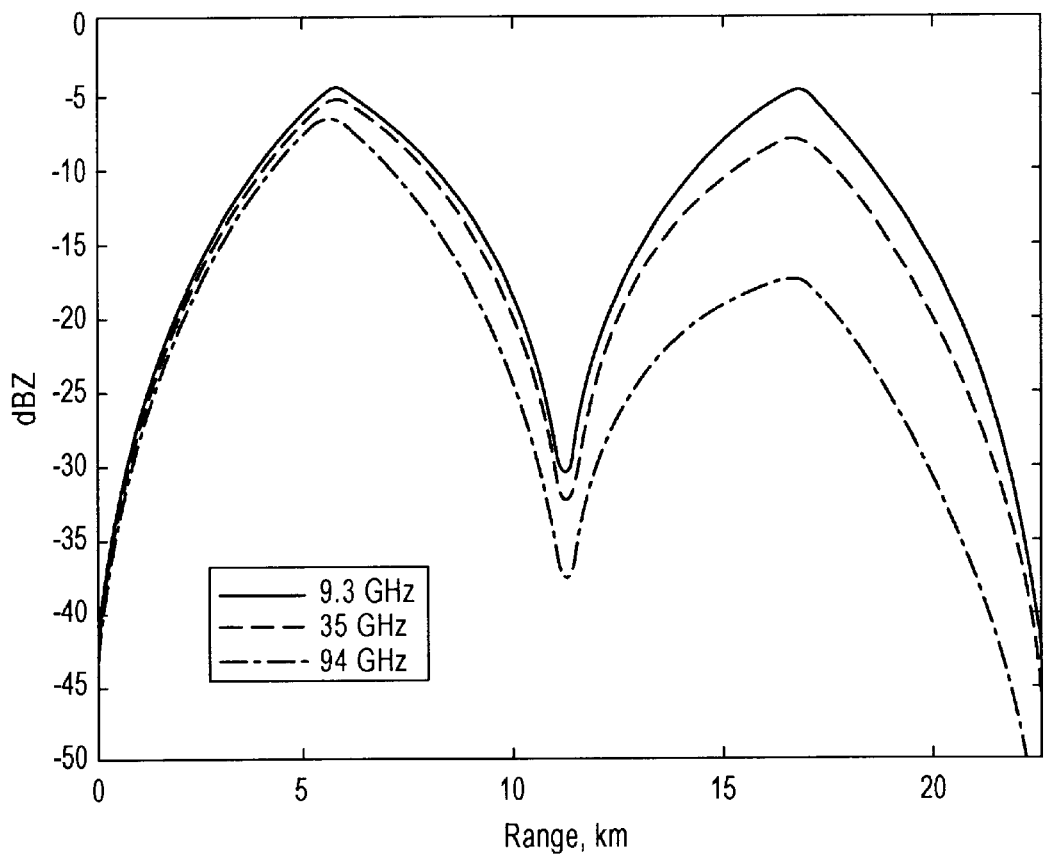
FIG. 13 is a graph of range vs. reflectivity factor at X-, $K_a$- and W-band frequencies in an example of the invention.

For this embodiment, the drop size distribution of cloud particles is assumed to be modified Gamma distribution with the shape parameters $\alpha=2$ and $\gamma=1$. The other 2 parameters a (scaling parameter) and b (intercept parameter) are calculated from the LWC and RES. Those skilled in the art will understand the use of $\alpha$, $\gamma$, a and b parameters in modified Gamma distribution. The radar reflectivity is normalized at temperature 0° C. FIG. 13 depicts a graph of range vs. reflectivity factor in an example of the invention. FIG. 13 shows the simulated reflectivity factors at three channels of 9.3, 35, and 94 GHz. The reflectivity at 9.3 GHz is on the top, at the least attenuation. The dBZ at 94 GHz has the most attenuation and the signal is weak.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

What is claimed:

1. A method of determining temperature of a physical medium using remote measurements, the method comprising:
    receiving a first received signal from an interaction of a first transmitted pulsed radar signal with the physical medium;
    receiving a second received signal from the interaction of a second transmitted pulsed radar signal with the physical medium;
    receiving a third received signal from the interaction of a third transmitted pulsed radar signal with the physical medium;
    determining a first received signal information based on the first received signal;
    determining a second received signal information based on the second received signal;
    determining a third received signal information based on the third received signal;
    determining attenuation differences between the first received signal information, the second received signal information, and the third received signal information; and
    determining the temperature of the physical medium based on the attenuation differences between the first received signal information, the second received signal information, and the third received signal information.

2. The method of claim 1 further comprising:
    generating and transmitting the first transmitted pulsed radar signal into the physical medium;
    generating and transmitting the second transmitted pulsed radar signal into the physical medium; and
    generating and transmitting the third transmitted pulsed radar signal into the physical medium.

3. The method of claim 1 wherein the physical medium comprises particles.

4. The method of claim 1 wherein the physical medium comprises scatterers.

5. The method of claim 1 further comprising determining a specific mass of the physical medium.

6. The method of claim 5 wherein determining the specific mass of the physical medium is based on the temperature.

7. The method of claim 5 wherein determining the specific mass of the physical medium is based on the first received signal information, the second received signal information, and the third received signal information.

8. The method of claim 1 further comprising determining a characteristic size of the physical medium.

9. The method of claim 8 wherein determining the characteristic size is based on the temperature.

10. The method of claim 8 wherein determining the characteristic size is based on the at least one first received signal information.

11. The method of claim 1 wherein determining the temperature of the physical medium based on the attenuation differences further comprises:
    determining a first one of the attenuation differences based on the first received signal information and the second received signal information;
    determining a second one of the attenuation differences based on the first received signal information and the third received signal information;
    determining a ratio of the first one of the attenuation differences and the second one of the attenuation differences; and
    determining the temperature of the physical medium based on the ratio.

12. The method of claim 1 wherein determining the temperature is based on a scattering model.

13. The method of claim 1 wherein the interaction is scattering.

14. The method of claim 1 wherein the first received signal information is reflectivity.

15. The method of claim 1 wherein the first received signal information is a reflectivity factor.

16. The method of claim 1 wherein the first transmitted electromagnetic signal is a reference signal for estimation of attenuation.

17. A software product for determining temperature of a physical medium using remote measurements comprising:
    processing software operational when executed by a processor to direct the processor to receive a first received signal from an interaction of a first transmitted pulsed radar signal with the physical medium, receive a second received signal from the interaction of a second transmitted pulsed radar signal with the physical medium, receive a third received signal from the interaction of a third transmitted pulsed radar signal with the physical medium,
    determine a first received signal information based on the first received signal, determine a second received signal information based on the second received signal, determine a third received signal information based on the third received signal, determine attenuation differences between the first received signal information, the second received signal information, and the third received signal information, and determine the temperature of the physical medium based on the attenuation differences between the first received signal information, the second received signal information, and the third received signal information; and
    a software storage medium operational to store the processing software.

18. The software product of claim 17 wherein the processing software is operational when executed by the processor to direct the processor to generate and transmit the first transmitted pulsed radar signal into the physical medium, generate and transmit the second transmitted pulsed radar signal into the physical medium, and generate and transmit the third transmitted pulsed radar signal into the physical medium.

19. The software product of claim 17 wherein the physical medium comprises particles.

20. The software product of claim 17 wherein the physical medium comprises scatterers.

21. The software product of claim 17 wherein the processing software is operational when executed by the processor to direct the processor to determine a specific mass of the physical medium.

22. The software product of claim 21 wherein the processing software is operational when executed by the processor to direct the processor to determine the specific mass of the physical medium based on the temperature.

23. The software product of claim 21 wherein the processing software is operational when executed by the processor to direct the processor to determine the specific mass of the physical medium based on the first received signal information, the second received signal information, and the third received signal information.

24. The software product of claim 17 wherein the processing software is operational when executed by the processor to direct the processor to determine a characteristic size of the physical medium.

25. The software product of claim 24 wherein the processing software is operational when executed by the processor to direct the processor to determine the characteristic size based on the temperature.

26. The software product of claim 24 wherein the processing software is operational when executed by the processor to direct the processor to determine the characteristic size based on the at least one first received signal information.

27. The software product of claim 17 wherein the processing software is operational when executed by the processor to direct the processor to determine a first one of the attenuation differences based on the first received signal information and the second received signal information, determine a second one of the attenuation differences based on the first received signal information and the third received signal information, determine a ratio of the first one of the attenuation differences and the second one of the attenuation differences, and determine the temperature of the physical medium based on the ratio.

28. The software product of claim 17 wherein the processing software is operational when executed by the processor to direct the processor to determine the temperature based on a scattering model.

29. The software product of claim 17 wherein the interaction is scattering.

30. The software product of claim 17 wherein the first received signal information is reflectivity.

31. The software product of claim 17 wherein the first received signal information is a reflectivity factor.

32. The software product of claim 17 wherein the first transmitted electromagnetic signal is a reference signal for estimation of attenuation.

33. A system for determining temperature of a physical medium using remote measurements, the system comprising:
a receiver configured to receive a first received signal from an interaction of a first transmitted pulsed radar signal with the physical medium, receive a second received signal from the interaction of a second transmitted pulsed radar signal with the physical medium, and receive a third received signal from the interaction of a third transmitted radar pulsed signal with the physical medium; and
a processing system connected to the receiver and configured to determine a first received signal information based on the first received signal, determine a second received signal information based on the second received signal, determine a third received signal information based on the third received signal, determine attenuation differences between the first received signal information, the second received signal information, and the third received signal information, and determine the temperature of the physical medium based on the attenuation differences between the first received signal information, the second received signal information, and the third received signal information.

34. The system of claim 33 wherein the receiver is configured to generate and transmit the first transmitted pulsed radar signal into the physical medium, generate and transmit the second transmitted pulsed radar signal into the physical medium, and generate and transmit the third transmitted pulsed radar signal into the physical medium.

35. The system of claim 33 wherein the physical medium comprises particles.

36. The system of claim 33 wherein the physical medium comprises scatterers.

37. The system of claim 33 wherein the processing system is configured to determine a specific mass of the physical medium.

38. The system of claim 37 wherein the processing system is configured to determine the specific mass of the physical medium based on the temperature.

39. The system of claim 37 wherein the processing system is configured to determine the specific mass of the physical medium based on the first received signal information, the second received signal information, and the third received signal information.

40. The system of claim 33 wherein the processing system is configured to determine a characteristic size of the physical medium.

41. The system of claim 40 wherein the processing system is configured to determining the characteristic size based on the temperature.

42. The system of claim 40 wherein the processing system is configured to determine the characteristic size based on the at least one first received signal information.

43. The system of claim 33 wherein:
the processing system is configured to determine a first one of the attenuation differences based on the first received signal information and the second received signal information, determine a second one of the attenuation differences based on the first received signal information and the third received signal information, determine a ratio of the first one of the attenuation differences and the second one of the attenuation differences, and determine the temperature of the physical medium based on the ratio.

44. The system of claim 33 wherein the processing system is configured to determine the temperature based on a scattering model.

45. The system of claim 33 wherein the interaction is scattering.

46. The system of claim 33 wherein the first received signal information is reflectivity.

47. The system of claim 33 wherein the first received signal information is a reflectivity factor.

48. The system of claim 33 wherein the first transmitted electromagnetic signal is a reference signal for estimation of attenuation.

* * * * *